United States Patent [19]

Brown et al.

[11] 4,271,131
[45] Jun. 2, 1981

[54] PRODUCTION OF HIGHLY PURE LITHIUM CHLORIDE FROM IMPURE BRINES

[75] Inventors: Patrick M. Brown, Exton; Susan R. Jacob, Royersford; Daniel A. Boryta, Downingtown, all of Pa.

[73] Assignee: Foote Mineral Company, Exton, Pa.

[21] Appl. No.: 28,973

[22] Filed: Apr. 11, 1979

[51] Int. Cl.$^3$ ............................................ C01D 15/04
[52] U.S. Cl. .................... 423/179.5; 23/297; 23/298; 159/1 S; 423/158; 423/164; 423/166
[58] Field of Search .................... 423/179.5, 164, 166, 423/158, 189, 190; 23/297, 298; 159/1 S

[56] References Cited

U.S. PATENT DOCUMENTS

| | | |
|---|---|---|
| 2,561,439 | 7/1951 | Erasmus . |
| 2,726,138 | 12/1955 | Cunningham . |
| 3,268,289 | 8/1966 | Macey . |
| 3,268,290 | 8/1966 | Gaska et al. . |
| 3,278,260 | 10/1966 | Hermann . |
| 3,342,548 | 9/1967 | Macey . |
| 3,537,813 | 11/1970 | Nelli et al. . |

OTHER PUBLICATIONS

Chemical and Engineering News, vol. 44, (1966), pp. 38 and 39, (Reprint).
Chemical Engineering, Aug. 15, 1966, pp. 86–88, (Reprint).
Chemical Week, May 14, 1966, (Reprint).

Primary Examiner—O. R. Vertiz
Assistant Examiner—Wayne A. Langel
Attorney, Agent, or Firm—Howson & Howson

[57] ABSTRACT

Highly pure lithium chloride suitable for use in production of lithium metal by electrolysis is obtained directly from impure natural or other lithium chloride brines by an integrated process in which the brine is first concentrated by solar energy to a lithium chloride concentration of about 3%, after which the brine is treated with lime and calcium chloride to convert such impurities as boron, magnesium and sulfate to a calcium borate hydrate, magnesium hydroxide and calcium sulfate dihydrate, respectively, and separating the precipitated calcium sulfate dihydrate from the brine. The brine is then further concentrated to 40% or more lithium chloride by means of solar or other energy, during which concentration step the calcium borate hydrate, magnesium hydroxide and calcium sulfate dihydrate precipitate from the brine. The highly concentrated brine is subjected to evaporation at a temperature above 101° C. to produce anhydrous lithium chloride which is further heated to a temperature of 200° C. or more, followed by extraction of the lithium chloride with isopropanol. After removal of solvent a highly pure lithium chloride product is obtained.

7 Claims, 3 Drawing Figures

PRODUCTION OF HIGHLY PURE LITHIUM CHLORIDE FROM IMPURE BRINES

BACKGROUND OF THE INVENTION

Lithium metal has many uses and, to name a few, they include nuclear power application where a blanket of the liquid metal or its molten salts is used for breeding purposes in nuclear fusion reactors, in lightweight, compact lithium/sulfur batteries for electric cars and for power plant load leveling purposes, as a degasifier in the production of high-conductivity copper and bronze, and in the synthesis of compounds for use in the field of medicine.

Lithium metal is generally produced by electrolysis of an eutectic mixture of highly pure molten lithium chloride and potassium chloride.

There are naturally occurring brines in the United States which contain reasonable concentrations of lithium, in the form of the chloride, so as to be considered viable reserves for lithium recovery. Three particular sources include Searle's Lake, California, the Great Salt Lake, Utah, and Clayton Valley, Nevada. The latter is the most economical source of lithium since the magnesium to lithium ratio is low, generally about 1.15:1, which allows for a simplified process of concentrating, purifying and recovering lithium chloride brine. Lithium carbonate is then obtained by treatment of the brine with soda ash.

To make lithium metal, the lithium carbonate is converted to lithium hydroxide via a liming process, and the latter compound in turn is converted to lithium chloride by treatment with hydrochloric acid follwed by drying. This is a very circuitous and expensive route to lithium chloride, since lithium originally exists as the chloride in the natural brine. Thus, for many years there has been the need for a direct economical method for recovering lithium chloride as such from natural brines.

Natural brine typically contains only a few hundred parts per million of lithium in conjunction with substantial quantities of sodium, potassium and magnesium chlorides and sulfates, as well as other minor contaminants such as bromides, rubidium, boron and organic compounds. In the manufacture of lithium metal by electrolysis of lithium chloride, the alkaline earth metals must first be removed from the lithium chloride, otherwise they will be present as contaminants in the lithium metal. Similarly, sodium must be removed since the presence of very small quantities thereof in the lithium metal will make it highly reactive and much different in properties than high purity lithium metal. Also, during the electrolysis of lithium chloride, non-volatile anions, such as sulfate and borate, will build up resulting in very rapid short circuiting of the cell. Since cell costs are quite high, continuous uninterrupted operation thereof for extended periods of time, e.g. six months to a year, must be realized.

It is a primary object of this invention to provide an integrated process for the economic recovery of high purity lithium chloride directly from naturally occurring or other lithium chloride brines.

Another object of this invention is to provide a process for direct recovery of high purity lithium chloride from crude lithium chloride brines in which losses of lithium values are minimized.

These and other objects of this invention will become apparent from a consideration of this specification, appended claims and drawings.

SUMMARY OF THE INVENTION

In accordance with the present invention, it was discovered that a high percentage of lithium values present as lithium chloride in naturally occurring or other brines can be recovered directly as the chloride, rather than being converted to other intermediate lithium compounds, such as the carbonate, by an integrated process involving a series of novel processing steps. More particularly, the integrated process of the invention by means of which such objective is attained comprises subjecting a brine, which advantageously may be a natural brine, containing at least about 100 ppm lithium, present as lithium chloride, to solar evaporation to increase the concentration of lithium chloride to about 3%, by weight, or somewhat more, and to precipitate sodium and potassium chlorides. During the solar concentration, slaked lime may be added to the brine while in the pond system to precipitate magnesium as magnesium hydroxide. The brine containing 3% or more of lithium chloride is then treated with an aqueous slurry of slaked lime and an aqueous solution of calcium chloride to convert magnesium, sulfate and boron impurities to magnesium hydroxide, calcium sulfate dihydrate (gypsum) and a calcium borate hydrate of the formula $CaB_2O_4 \cdot 6H_2O$, respectively. The gypsum, which precipitates, is separated from the brine. Thereafter, the pH of the brine which is about 11 by reason of addition of slaked lime, slowly decreases to about 9.5 during further solar evaporation due to precipitation of basic salts and absorption of atmospheric carbon dioxide. Such pH change causes boron to be precipitated as the aforesaid calcium borate hydrate. Further quantities of calcium chloride may be added to the brine during evaporation to promote boron and sulfate precipitation.

In an alternate procedure, after addition of lime and calcium chloride and separation of precipitated gypsum, the pH of the brine is adjusted to about 8.0 to about 8.4 to form a calcium borate hydrate of the formula $2CaO \cdot 3B_2O_3 \cdot 13H_2O$ which precipitates and is removed during further evaporation of the brine.

The brine, after having undergone such purification step, is further evaporated, preferably by a novel solar evaporation step described hereinbelow, to increase the lithium chloride concentration thereof to at least about 40%, by weight. This concentrated brine is then subjected to further evaporation, preferably under vacuum, at a temperature of at least about 101° C. to produce anhydrous lithium chloride. The lithium chloride is heated to a temperature of at least about 200° C., cooled and extracted with isopropanol. The solvent extract is filtered and the solvent is then removed to provide highly pure lithium chloride suitable for use in the production of lithium metal by electrolysis.

BRIEF DESCRIPTION OF THE DRAWINGS

The accompanying drawing

DETAILED DESCRIPTION OF THE INVENTION

Figure 1:
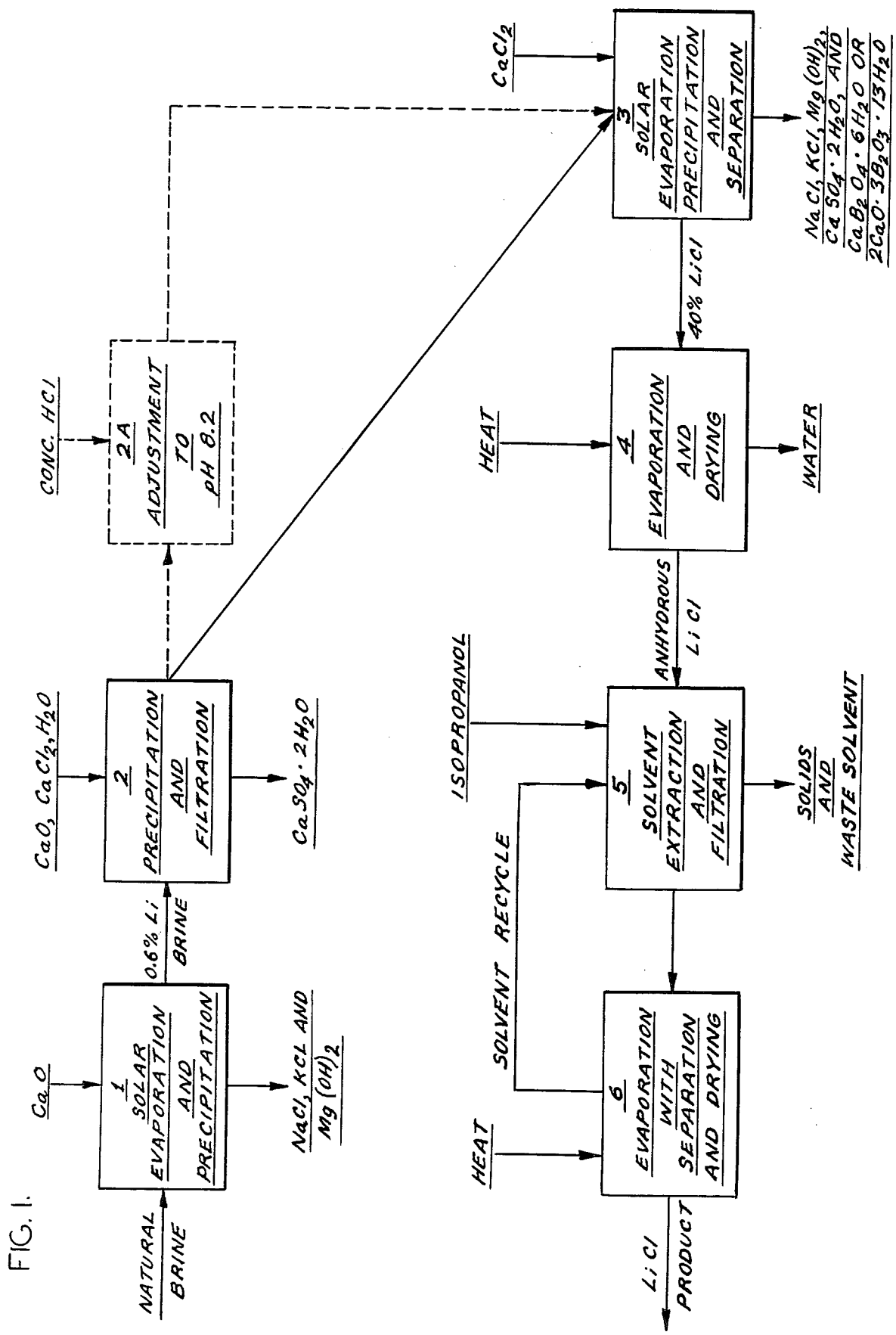
FIG. 1 is a diagrammatic or schematic illustration of the integral steps involved in carrying out the process of the present invention.

As indicated previously, in lithium containing brines, the sodium, potassium, magnesium, calcium, sulfate and boron content have to be minimized in order to produce a lithium chloride product suitable for production of lithium metal by electrolysis. Alkali and alkaline earth metals, must be removed from the lithium chloride, otherwise they will be present as contaminants in the lithium metal. During electrolysis of lithium chloride, non-volatile anions, such as sulfate and borate, will build up, resulting in rapid short-circuiting of the cell.

The presence of boron also results in losses of lithium on concentration of the brine. More particularly, on concentration of a lithium containing brine, boron, if present in significant quantitites, e.g. 0.2% or more, will precipitate lithium values as lithium tetraborate tetrahydrate ($Li_2B_4O_7.4H_2O$). Depending upon the boron concentration of the brine, such losses of lithium can be economically significant.

The present integrated process is designed to produce a highly pure lithium chloride product suitable for manufacture of lithium metal by electrolysis directly from a lithium chloride brine, such as a natural brine, in an economical fashion. The invention is hereinafter described in detail in connection with a natural brine whose source is Clayton Valley, Nevada, and the use of a pond system for solar evaporation there located in the process. It is to be understood that the process applies to lithium chloride brine from any source and that the practice of the invention is not limited to any specific geographic area, although since the process involves in part the use of solar energy to concentrate the brine, consideration should be given to the geographic location of the plant where the process is to be practiced to insure that there is adequate solar energy during a substantial portion of the year to obtain the desired degree of solar evaporation of the brine. Although less economical, a portion of the evaporation may be effected by application of heat generated by combustion of fossil fuels and the like, and such alternative procedure is also within the scope of this invention.

The various steps of the process of the invention are described in connection with FIG. 1, the number given each step corresponding to that illustrated in the drawing by a box bearing a like number.

The brine available at Clayton Valley, Nevada contains on the order of about 200 to 400 ppm lithium, present as lithium chloride. The weight ratio of magnesium to lithium is only about 1.15:1, and of potassium to lithium about 15:1. It has been determined that brines having at least about 100 ppm lithium are suitable starting materials for the present process. Thus, the natural brine available at Clayton Valley provides an excellent source material for the process.

At Clayton Valley, saline brine is pumped from one or more operating wells and delivered to a pond system which covers over 1000 acres for solar evaporation according to Step 1, FIG. 1 of the integrated process.

During on concentration by means of solar energy in Step 1, the brine is first held in a 650-acre pond until the lithium concentration increases from the initial apprxoimately 250 ppm (0.025%). The brine is then transferred to a 150-acre pond. After the lithium concentration reaches 0.08%, the brine is transferred to several 50-acre ponds. En route, lime may be added to precipitate magnesium in the brine which precipitates out in an intermediate settling pond. Such lime treatment reduces the concentration of magnesium to a few parts per million in the brine.

The brine remains in the 50-acre ponds until the concentration of lithium chloride reaches 2%, by weight. It is then transferred to a series of 10-acre ponds. As solar evaporation increases the concentration of lithium chloride to 3%, potassium chloride and sodium chloride precipitate. A representative composition of brine, obtained by solar evaporation and lime treatment in Step 1 of the process as described hereinabove is set forth in Table I.

TABLE I

| Constituent | Weight Percent | |
|---|---|---|
| Li | 0.615 | (3.76% LiCl) |
| Na | 6.73 | |
| K | 4.82 | |
| Mg | 0.0022 | |
| Ca | 0.0081 | |
| B | 0.21 | |
| $SO_4$ | 2.22 | |
| Cl | 16.37 | |
| Br | 0.05 | |
| $H_2O$ | 66.56 | |

Such brines typically have a pH of about 9.6 and a specific gravity of about 1.241 at 23° C.

In practicing Step 2 of the process of the invention, a slurry of slaked lime is added to the lithium chloride brine from Step 1, such brine having the composition as to which that given in Table I, above, is representative. The quantity of slaked lime added to the brine should be sufficient to react with remaining magnesium present to reduce the concentration of magnesium to not more than about 2 ppm, the magnesium being converted to relatively insoluble magnesium hydroxide which precipitates and separates out on further evaporation of the brine. By determining the magnesium concentration of the impure brine from Step 1, the amount of slaked lime to be added can be readily ascertained. Upon addition of the slaked lime, the pH of the brine increases to about 11.

An aqueous solution of calcium chloride, e.g. a solution containing from about 5 to about 20 weight percent, preferably about 10 percent, calcium chloride, is then added to the brine to precipitate sulfate as substantially insoluble calcium sulfate dihydrate (gypsum). In addition to reacting with sulfate to form calcium sulfate dihydrate, the calcium chloride reacts with boron present in the brine to form a calcium borate hydrate, of the formula $CaB_2O_4.6H_2O$, which has limited solubility in the brine. The total quantity of calcium chloride employed should be substantially the stoichimetric quantity required to react with all of the boron and sulfate present in the brine.

Following addition of calcium chloride, the brine is subjected to a liquid-solids separation to remove the precipitated gypsum. Various well known methods, such as settling and decantation, filtration and centrifugation, may be employed to effect such liquid-solids separation.

The brine, treated as above in Step 2, is then subjected to evaporation in Step 3, described hereinbelow, during which step magnesium hydroxide, gypsum and the calcium borate hydrate precipitate and thus are separated from the brine.

According to the alternate procedure of Step 2A, after removal of precipitated gypsum as described above, the pH of the brine is reduced to a pH in the range of about 8.0 to about 8.4, preferably to about 8.2, by addition of the appropriate quantity of hydrochloric acid. At a pH in the aforesaid range, calcium borate hydrate, having the formula $2CaO.2B_2O_3.13H_2O$ is formed, and in large measure precipitates.

Steps 2 and 2A of the integrated process of this invention are the subject matter of copending application Ser. No. 028,975 filed Apr. 11, 1979, and the more detailed description of such process steps as set forth in that application is incorporated herein by reference.

In Step 3 of the integrated process, the purified brine from Step 2 or 2A is further concentrated, at least in part by solar energy, and preferably the further concentration of the brine is accomplished by means of solar energy utilizing the novel process of copending application Ser. No. 028,976, filed Apr. 11, 1979.

In Step 3 the solar evaporation may be carried out in a pond system comprising a series of interconnected shallow ponds (e.g. one foot or less in depth) having a relatively large surface area through which the brine is caused to flow in a regulated manner. It should be understood that the number of ponds and the total area thereof will in large measure be predicated on the volume of brine to be processed in a given period of time. A suitable pond system may comprise on the order of four ponds, the size of the ponds decreasing with increasing concentration of lithium chloride. As would be expected, the larger the pond area, the greater will be the quantity of water evaporated for a given evaporation rate. Preferably, the pond sizes are selected so that in each pond the volume of brine is reduced by about one half due to solar evaporation during the period the brine remains in the pond.

For economic reasons, it is desirable to concentrate the brine to the desired extent, i.e. about 40% or more lithium chloride, entirely by solar evaporation. However, the brine may be concentrated to some intermediate degree, e.g. to a lithium chloride concentration of about 25% by solar evaporation, following which further concentration of the brine may be effected by other sources of energy, such as fossil fuels.

However, as indicated previously, according to a preferred practice of this invention, the brine is subjected to solar evaporation to the extent necessary to increase the lithium chloride concentration to 40% or more. This result may be accomplished by flowing the dilute brine from Step 2 or 2A into a pond system as hereinabove described, and regulating the flow of the brine through the pond system so that through evaporation by means of solar energy the concentration of the brine, at a point intermediate the points of introduction and withdrawal of the brine from the pond system, is increased to provide a brine whose concentration has a vapor pressure which, under ambient conditions, is substantially in equilibrium with the partial pressure of moisture in the atmosphere at the geographic location of the pond system. The flow of the more concentrated brine through the remainder of the pond system is then further regulated so that through solar energy the temperature of the brine, for at least a substantial portion of the daylight hours, exceeds that of the air immediately above the pond system, whereby the vapor pressure of the brine exceeds the partial pressure of moisture in the atmosphere above the pond system and additional water is thereby evaporated from the brine to increase further the concentration of lithium chloride in the brine.

It was unexpected that such a result could be attained since predictions based on climatic conditions at Clayton Valley, Nevada, indicated that the average concentration of lithium chloride in the brine during the eight month period of March to October would not exceed about 31% as a result of solar evaporation (see the discussion at pages 5 to 8 of copending application Ser. No. 028,976).

During the evaporation process, the concentration of calcium, boron and sulfate is monitored and, if necessary, additional calcium chloride, preferably as a 10 percent solution is added to the brine to obtain the desired stoichiometry. This is usually necessary since there is a 10 to 15 fold evaporation factor in the evaporation process and analytical variability ($\pm 3\%$) mandates adjustment at higher concentrations for improved accuracy to minimize lithium losses by reason of the presence of boron and sulfate, while not contaminating the final brine with excess calcium.

After the brine has been concentrated to the desired degree by solar evaporation, it is subjected to a liquid-solids separation step, e.g. decantation, centrifugation or filtration, and in Step 4 the liquid phase is subjected to evaporation, preferably under vacuum to obtain solid lithium chloride which is dried. Removal of water at temperatures in excess of 101° C., and preferably on the order of about 110° C. should be effected in order to obtain anhydrous lithium chloride, rather than the monohydrate.

According to the process of the present invention the anhydrous lithium chloride obtained as above is heated to a temperature of at least 200° C., but generally a temperature not substantially exceeding the melting point of the compound which is about 613° C. Preferably, the brine which has been concentrated by solar evaporation, is subjected to evaporation at a temperature above about 101° C., by application of heat, under vacuum if desired, to generate a slurry containing on the order of 35% by weight of solids. The solids may then be separated from the liquid phase by filtration or centrifugation while the temperature of the slurry is maintained in excess of about 101° C. The solids may then be introduced to a suitable drier, e.g. of the rotary type, where they are heated at a temperature in excess of 200° C., and preferably between about 270° and 325° C. for a period sufficient to reduce the moisture content to less than about 0.5%.

The heating of the lithium chloride to temperatures above about 200° C. produces certain beneficial results. Organic contaminants are vaporized, pyrolyzed or at least rendered insoluble in isopropanol, the selective solvent for lithium chloride used in the present process, and thereby are removed. In addition, borates present, which also are soluble in isopropanol, are converted to boron oxide which is insoluble in this solvent and thus the possibility of the lithium chloride being contaminated with amounts of boron unacceptable for many purposes is greatly decresed.

The lithium chloride is subsequently cooled to ambient temperatures and extracted with isopropanol in Step 5 of the process. The amount of isopropanol used should be such that the weight ratio of isopropanol to salt to be extracted is from about 5:1 to about 10:1, a weight ratio of about 7:1 being preferred.

The extraction step may be carried out under ambient temperature conditions; however, temperatures in the order of 20° C. up to 83° C., the boiling point of isopropanol, may be used. Employing extraction temperatures of 83° C. or more would, of course, result in loss of solvent through volatilization.

The extraction time may vary considerably, e.g. from 1 to 24 hours, depending upon the size of the lithium chloride (salt) particles, agitation rate and solvent temperature. Generally good results can be obtained by slurrying the salt in the isopropanol with good agitation for a period of about 3 hours.

The isopropanol-salt slurry is next subjected to a liquid-solids separation, as for example by filtration. The filterability of the slurry and rate of separation of solids from the liquid are dependent upon drying temperatures of lithium chloride as described hereinabove and in certain of the subsequent examples.

The degree of separation, i.e. the removal of solids from the liquid phase is dependent upon the desired utility for the lithium chloride produced.

In obtaining a lithium chloride product of low sodium and boron content for use as an electrolyte for the production of high purity lithium metal, it is desirable that the filtrate have a Nephlometric Turbidity of less than about 3. This will insure that the sodium level is less than about 50 ppm. Such result can be accomplished by filtering the liquid phase several times through suitable filter media. For example, the liquid phase can be twice filtered through a D porosity filter, the second filtration being carried out through the wet filter cake of the primary filtration. Even lower levels of sodium can be obtained by use of very fine, such as 0.45 μm millipore, filters.

Figure 2:
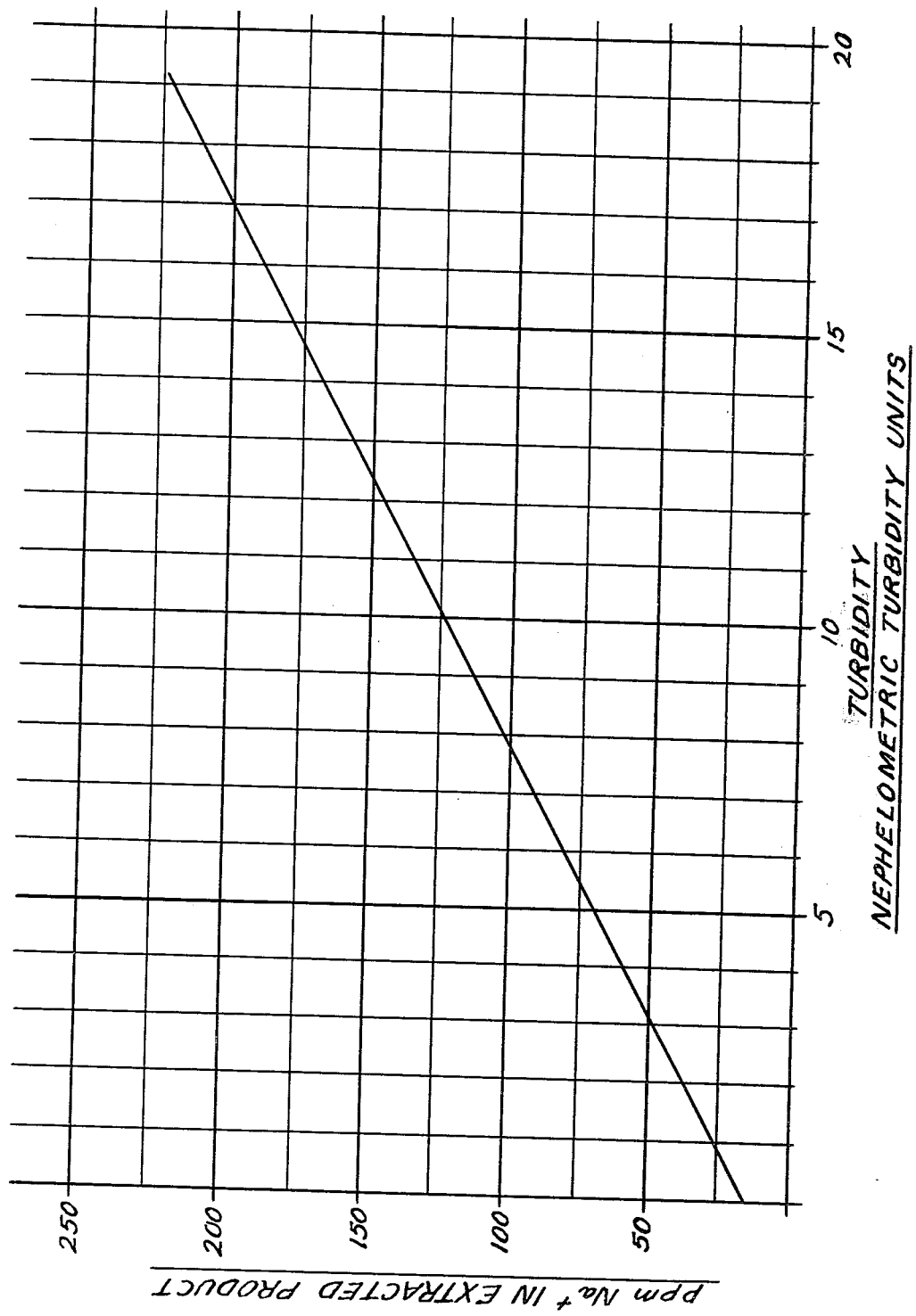
FIG. 2 is a plot of sodium in parts per million (ppm) in the lithium chloride product versus turbidity of the isopropanol extract after filtration, measured in Nephlometric Turbidity Units.

FIG. 2 hereto is a plot of sodium in parts per million in the lithium chloride product versus turbidity, measured in Nephlometric Turbidity Units. The data used to plot the graph of FIG. 2 was obtained using a Fisher DRT-100 Turbidimeter. As can be seen by reference to FIG. 2, to obtain a lithium chloride product containing less than 50 ppm sodium the turbidity should not substantially exceed about 3.

Following the liquid-solids separation step, the isopropanol is removed in Step 6, preferably by heating the solution of lithium chloride in isopropanol under atmospheric pressure and at moderate temperatures, e.g. about 90° C., followed by removing any remaining solvent under vacuum at reduced temperatures to prevent overheating of the product and solvent degredation. The isopropanol can be recovered and recycled to the solvent extraction step, and dry lithium chloride of high purity recovered.

Those steps of the integrated process of this invention in which the lithium chloride is heated to temperatures above about 200° C., cooled and extracted with isopropanol is the subject matter of copending application Ser. No. 028,974 filed Apr. 11, 1979, and additional details of such steps are incorporated herein by reference.

Figure 3:
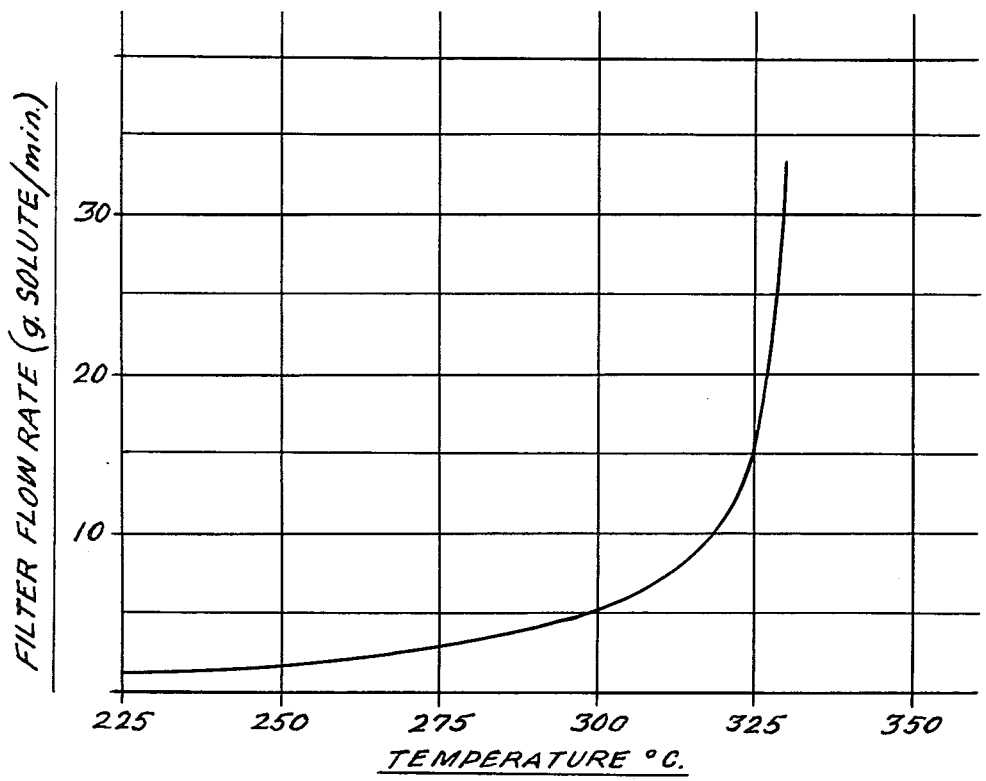
FIG. 3 is a plot of filtration rate of the isopropanol extract as a function of lithium chloride drying temperature.

FIG. 3 hereto is a plot of filtration rate of the isopropanol extract as a function of drying temperature, and shows that for crude lithium chloride salt dried at temperatures above about 300° C., the filtration rate increases rapidly, particularly when drying temperatures on the order of 325° C. are used.

Differential thermal analysis performed on the crude salt revealed an exotherm at 354° C. which has been assigned to the lithium chloride/potassium chloride eutectic melting point. The elimination of fine particles of potassium chloride by heating to elevated temperatures is believed to account for the increased filtering rates.

The anhydrous lithium chloride obtained as herein described finds particular use as an electrolyte in the production of lithium metal whose various uses have been described above. A typical analysis of such a high purity product is given in Table II below:

TABLE II

| Constituent | Weight Percent |
|---|---|
| Li | 16.06 |
| Na | 0.0029 |
| K | 0.0013 |
| Mg | 0.0001 |
| Ca | 0.0054 |
| $SO_4$ | 0.0016 |
| Cl | 83.34 |
| Fe | 0.0001 |
| Br | 0.091 |
| $H_2O$ | 0.09 |
| B | 0.0004 |

It is claimed:

1. An integrated process for producing highly pure lithium chloride from a brine containing at least about 100 ppm lithium in the form of lithium chloride as well as sodium, potassium, magnesium, sulfate and boron as impurities which comprises subjecting said brine to a first solar evaporation in a first pond system consisting of a series of shallow ponds of relatively large surface area to obtain a first brine concentrate containing at least about 3% by weight lithium chloride and to precipitate sodium and potassium chlorides, slaked lime being added to said brine during said first evaporation to precipitate magnesium as magnesium hydroxide, adding slaked lime and calcium chloride to said first brine concentrate to convert any remaining magnesium to magnesium hydroxide, sulfate to calcium sulfate dihydrate, and boron to a calcium borate hydrate, separating precipitated calcium sulfate dihydrate from said brine, subjecting said brine to a second solar evaporation in a second pond system consisting of a series of shallow ponds of relatively large surface area to increase the concentration of lithium chloride to at least about 25% by weight, and to precipiate magnesium hydroxide, calcium sulfate dihydrate and calcium borate hydrate, evaporating additional water from said brine to increase the concentration of lithium chloride therein to at least about 40% by weight, heating said more concentrated brine at a temperature above about 101° C. to produce anhydrous lithium chloride, heating said lithium chloride to a temperature above about 200° C., cooling said lithium chloride to ambient temperatures, extracting said lithium chloride with isopropanol, separating the liquid phase from the solid phase, removing said isopropanol from the liquid phase, and recovering a solid lithium chloride product of high purity.

2. The process according to claim 1 in which the pH of said brine after treatment with slaked lime and calcium chloride and separation of calcium sulfate dihydrate is adjusted from about 8.0 to about 8.4 by addition of hydrochloric acid and then subjected to said second solar evaporation.

3. The process according to claim 2 in which the pH of said brine is adjusted to about 8.2.

4. The process according to claim 1 in which said dilute brine from said first solar evaporation after treatment with slaked lime and calcium chloride, is subjected to a second solar evaporation in said second pond system to obtain a brine containing at least about 40% by weight of lithium chloride by a process which comprises providing a pond system consisting of a series of shallow ponds of relatively large surface area, flowing dilute lithium chloride brine into one end of said pond system, regulating the flow of said brine through said pond system so that through evaporation by means of solar energy the concentration of said brine, at a point intermediate the points of introduction to and withdrawal of the brine from said pond system, is increased to provide a brine whose concentration has a vapor pressure which under ambient conditions is substantially in equilibrium with the partial pressure of moisture in the atmosphere at the geographic location of said pond system, and further regulating the flow of said more concentrated lithium chloride brine through the remainder of said pond system so that through solar energy the temperature of said brine for at least a substantial portion of the daylight hours exceeds that of the air immediately above said pond system, whereby the vapor pressure of said brine exceeds the partial pressure of moisture in the atmosphere above said pond system and additional water is thereby evaporated from said brine to increase the concentration of lithium chloride in said brine to at least about 40% by weight.

5. The process according to claim 1 in which said anhydrous lithium chloride is heated to a temperature of from about 270° to about 325° C. prior to extraction with isopropanol.

6. The process according to claim 1 in which said anhydrous lithium chloride is extracted with from about 5 to about 10 parts by weight of isopropanol per part by weight of lithium chloride.

7. The process according to claim 1 in which isopropanol containing dissolved lithium chloride is passed through a very fine filter to provide a filtrate having a turbidity of less than about 3.

* * * * *